UNITED STATES PATENT OFFICE.

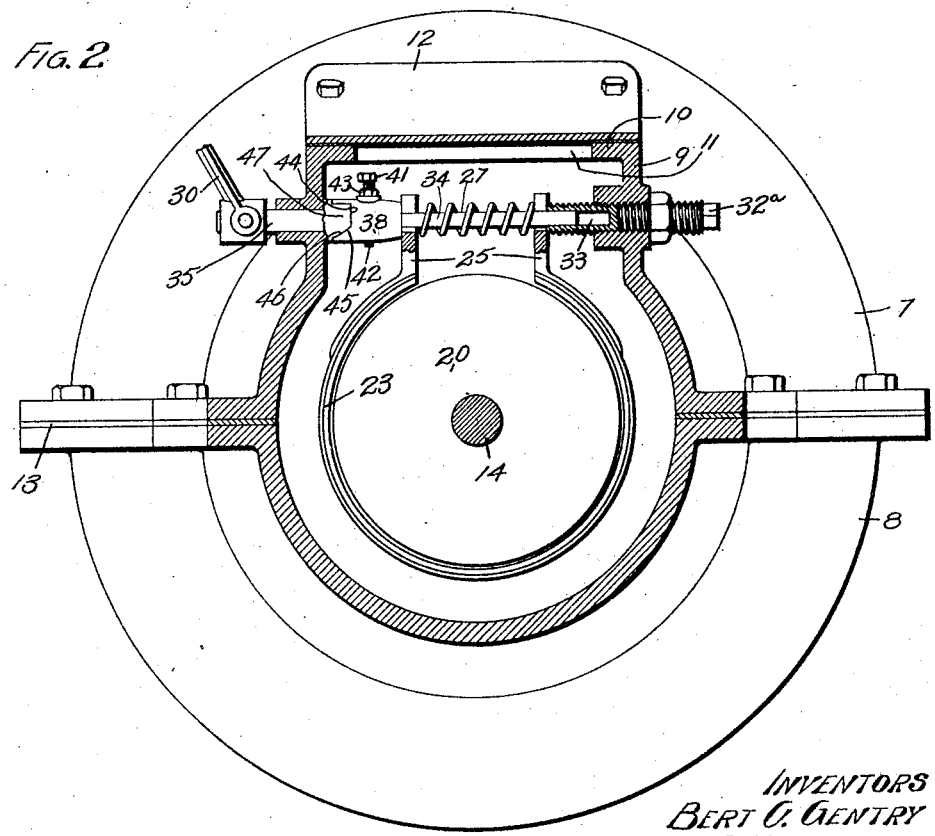

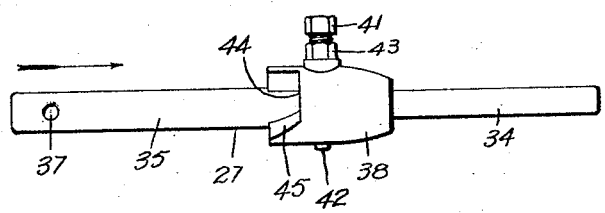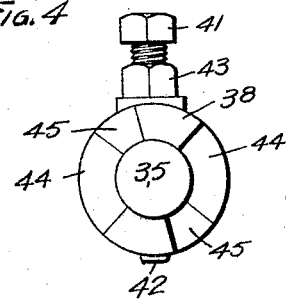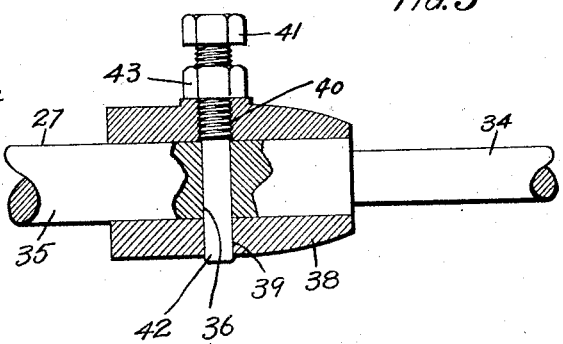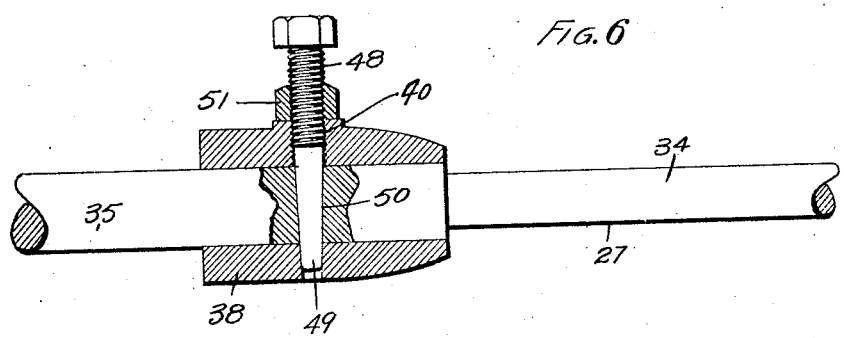

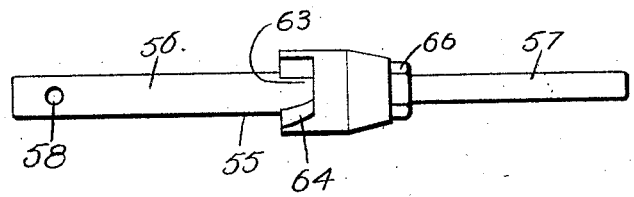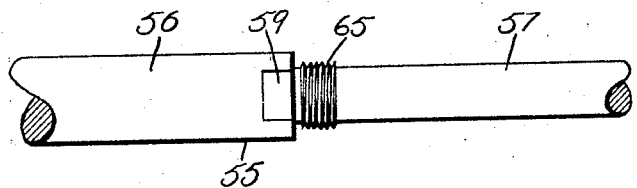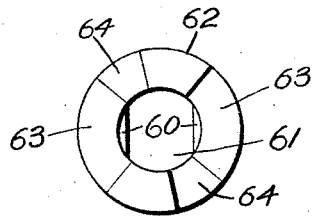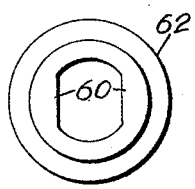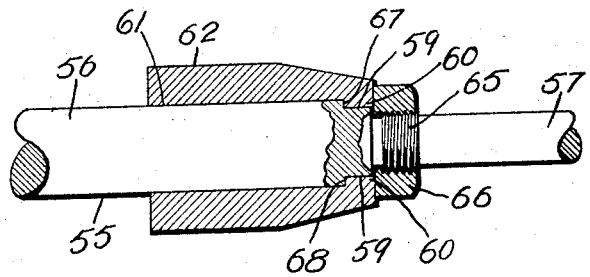

BERT C. GENTRY AND GLENN R. HOFFMAN, OF ST. LOUIS, MISSOURI; SAID HOFFMAN ASSIGNOR TO HERBERT A. DEWEEZ, OF ST. LOUIS, MISSOURI.

ATTACHMENT FOR PLANETARY TRANSMISSIONS.

1,419,371. Specification of Letters Patent. Patented June 13, 1922.

Application filed January 31, 1921. Serial No. 441,441.

*To all whom it may concern:*

Be it known that we, BERT C. GENTRY and GLENN R. HOFFMAN, citizens of the United States, and residents of the city of St. Louis and State of Missouri, have invented certain new and useful Improvements in Attachments for Planetary Transmissions, of which the following is a specification containing a full, clear, and exact description, reference being had to the accompanying drawings, forming a part hereof.

Our invention relates to improvements in attachments for planetary transmissions, and has for its primary object an attachment, which will permit the renewing of the brake bands in the transmission housing without removing the upper half of the transmission case.

A further object is to construct a planetary transmission in which the slow speed shaft can be removed without taking the transmission case apart.

In the drawings:

Fig. 1 is a top plan view of a planetary transmission with a portion of the case broken away showing the location of the several brake bands and drums with which they co-act.

Fig. 2 is an enlarged cross sectional view taken through the housing at the point where the low speed shaft extends through.

Fig. 3 is a side elevation of the low speed shaft removed from the housing.

Fig. 4 is an enlarged end view of the same looking in the direction indicated by the arrow in Fig. 3.

Fig. 5 is an enlarged vertical section of our attachment in position on the shaft.

Fig. 6 is a modified form of attachment using a tapered pin instead of straight.

Fig. 7 is a side elevation of a modified form of attachment.

Fig. 8 is a fragmental side elevation of the slow speed shaft used in our modified device.

Fig. 9 is an end view of the modified sleeve.

Fig. 10 is a view of the modified sleeve looking at the opposite end.

Fig. 11 is a fragmental sectional view showing the manner of assembling our modification.

Referring to the drawings, 7 indicates the upper half of a transmission case and 8 the lower. The upper half or portion 7 is provided with vertically extending walls 9 on which are integrally formed the inturned flanges 10. This leaves an opening 11 by which access can be had to the transmission case. This opening 11 is closed by the lid 12. In order to make the transmission case oil-proof, the gasket 13 is inserted between the portions 7 and 8 of the housing. Through this housing extends a shaft 14 on which are loosely secured the drums 19 and 20; the drum 19 being the reverse drum, the drum 20 the slow-speed drum, while the brake drum 21 is securely attached to the shaft. Surrounding the drums 19, 20 and 21 are brake bands 22, 23 and 24, respectively. These brake bands are provided with slotted ears 25 through which shafts 26, 27 and 28 extend. These shafts are surrounded by coil springs 29, which are of the expansion type and exert outward pressure on the ears. To the shafts 26, 27 and 28 are attached foot pedals 29$^a$, 30 and 31. These are for the purpose of compressing the ears 25 together and tightening the bands around the respective drums. The wear on the brake bands 22 and 24 is taken up by means of the nuts 32 and 30. The wear on the brake band 23 being taken up by means of the adjusting screw 32$^a$, which extends through the wall of the transmission housing. This stud or screw is provided with a cylindrical recess 33 in which the reduced end 34 of the shaft 27 has bearing. The shaft 27 is provided with the enlarged end 35 and through this enlarged end are formed openings 36 and 37, the opening 37 being for the purpose of securing the foot treadle thereto by means of a pin. Located on the portion 35 of the shaft 27 is a sleeve 38, which is provided with a smooth opening 39 and a screw threaded opening 40. These openings are designed to be brought in alignment with the opening 36 and the screw 41 then inserted. This screw is provided with a smooth portion 42, which may be either tapered or straight, as found desirable, and which is of less diameter than the bottom of the threads formed on the screw. The screw is prevented from accidental removal by means of a lock nut 43. The sleeve 38 is provided with detents or recesses 44, one face of which is inclined, as indicated by the numeral 45. This inclined portion is adapted to engage against the inclined face 46 of a tooth projection 47 formed on the inside of the housing and is for the purpose of tightening the band around the drum 20, when the foot lever 30 is pressed forward. The other brake bands are operated in a similar manner, except that in this case the inclined faces are on the outside of the transmission housing. This, however, is an old construction and well known in the art and will, therefore, not be described in detail.

In Fig. 6 we make use of a screw 48, which has its lower portion 49 tapered. This tapered portion is designed to fit within a tapered opening 50 formed in the enlargement 36 of the shaft 27. The purpose of making this pin tapered is that when the hole through the shaft 27 becomes worn, play in the sleeve 38 can be taken up by loosening the lock nut 51 and screw the screw 48 downward into the shaft. Heretofore in replacing brake bands, which has to be done very frequently on trucks employing the planetary type of transmission it was necessary to remove the upper half of the transmission housing. This resulted quite frequently in the packing between the two halves becoming broken and as this transmission housing contains oil an oil leak would develop, which caused an unnecessary amount of oil to be used. Furthermore, it required considerable time and trouble to remove this upper half. By the use of our device it is only necessary to remove the plate 12, then the screw 41 can be removed and the shaft 27 slipped out through the casing. The nuts 31 are also removed and the shafts on which they were secured removed. It is now possible to remove the brake bands through the opening 11 and replace them with new ones, after which the several shafts are inserted and the cover 12 replaced. This saves considerable time, as well as not requiring the services of an expert mechanic, as was heretofore the case. It is also easy to replace the shaft 27 in the event the shaft should become broken.

In the modified form shown in Figs. 7, 8, 9, 10 and 11, we employ a slow speed shaft 55, which is provided with the enlargement 56 and the reduced portion 57. Through the enlarged portion 56 is formed the opening 58, which is for the purpose of attaching the foot lever 30 thereto. The end of the enlargement adjacent the reduced portion is provided with flat faces 59, which are diametrically opposite each other. These flat faces are for the purpose of receiving the projections 60 formed in the bore 61 of the sleeve 62. The sleeve 62 is provided with a pair of recesses 63, which have one of their walls inclined as at 64. This inclined wall serving the same purpose as the inclined wall 45. Formed on the reduced portion 57 and in close proximity to the flat faces 59 is a screw threaded portion 65. This is for the purpose of receiving the nut 66, which locks the sleeve 62 on the shaft. The projections 60 terminate abruptly in shoulders 67, which fit against shoulders 68 formed on the enlargement 56. These shoulders prevent the sleeve from sliding toward the opening 58 while the nut prevents the sleeve from sliding in the opposite direction and the flat faces prevent any turning of the sleeve on the shaft. In order to remove this shaft from the transmission case the nut 66 is removed from the threads 65 and the sleeve can be readily slipped off from the reduced portion 57. In the construction of this modification the sleeve 62 is made shorter than the sleeve 38 so that the combined length of the sleeve 62 and nut 66 will be the same as the length of the sleeve 38. This is essential because if the sleeve and nut combined were longer than the sleeve 38 it would be impossible to release the brake band 23.

In transmissions as at present used the sleeve 38 is secured to the shaft 27 by means of a pin being driven therethrough and then riveted on both ends to prevent its accidental dislodgment, and when a shaft constructed in this manner breaks, it is necessary to remove the upper half of the housing and chisel riveted ends of the pin before the same can be removed.

In the practical operation of our improvement we have found that it is not necessary to remove the shaft 27 in its entirety, but only remove it sufficiently to permit the insertion of the band 23 around the drums, and then bring the ears 25 into a position so that the shaft can be slipped through the slots formed therein. In other words, it is not necessary to clear the opening 11 in its entirety or all of the way across in order to insert a new band.

Having fully described our invention what we claim is:

1. An attachment for planetary transmissions comprising a transmission case having an upper and a lower portion, a slow speed shaft mounted in the upper portion of the case, a brake band, a member carried by said shaft for actuating said brake band, and readily removable means for securing said member on said shaft, whereby said shaft may be readily removed from the casing without taking the casing apart.

2. An attachment for planetary transmissions comprising a transmission case having an upper and a lower portion, vertically extending walls forming a rectangular opening formed integral with said upper portion, a closure for said opening, a slow speed shaft mounted in two of said vertical walls, a sleeve carried by said shaft, and means carried by the sleeve for readily disconnecting the same from the shaft, whereby said shaft may be removed from the case without taking the same apart.

3. In an attachment for planetary transmissions, a slow speed shaft, a sleeve mounted on said shaft, a screw having a smooth cylindrical end secured in said sleeve, the smooth end passing through the shaft, and means for locking said screw to said sleeve.

4. An attachment for planetary transmissions comprising a transmission case having an upper and a lower portion, a slow speed shaft mounted in the upper portion of the case, a sleeve carried by said shaft, and means for removably securing said sleeve to said shaft for permitting its removal from the case without taking the case apart.

5. An attachment for planetary transmissions comprising a transmission case having an upper and lower portion, a slow speed shaft mounted in the upper portion of the case, a sleeve carried by said shaft, and means for readily connecting and disconnecting the sleeve upon said shaft.

6. In an attachment for planetary transmissions, a slow speed shaft, a readily removable sleeve mounted on said shaft, and a screw for detachably securing the sleeve on said shaft.

In testimony whereof, we have signed our names to this specification.

BERT C. GENTRY.
GLENN R. HOFFMAN.